(No Model.)

G. EVANS.
METAL TOOTH CROWN.

No. 472,344.  Patented Apr. 5, 1892.

WITNESSES:
Edw. F. Tourtellotte
Jas. W. Graham

INVENTOR
George Evans
BY
Witter Lesson
ATTORNEY

UNITED STATES PATENT OFFICE.

GEORGE EVANS, OF NEW YORK, N. Y.

METAL TOOTH-CROWN.

SPECIFICATION forming part of Letters Patent No. 472,344, dated April 5, 1892.

Application filed September 7, 1891. Serial No. 405,056. (No model.)

*To all whom it may concern:*

Be it known that I, GEORGE EVANS, a citizen of the United States, residing at New York, in the county of New York and State of New York, have invented certain new and useful Improvements in Metal Tooth-Crowns; and I do hereby declare the following to be a full, clear, and exact description of the invention, such as will enable others skilled in the art to which it appertains to make and use the same.

This invention relates to improvements in metallic tooth-crowns generally and especially to the metallic tooth-crown for which Letters Patent Nos. 373,346, 373,347, and 373,348 were granted to me November 15, 1887.

Seamless gold tooth-crowns, crowns made of one piece of gold, and crowns constructed of pieces of gold-plate soldered together when made of thin plate are much more easily and properly fitted over the crowns of natural teeth than when the gold is thick; but in fitting metal tooth-crowns to natural teeth the shaping and swaging to which they are subjected stretch the surface of the cusps and indentations of the grinding-section and the metal is reduced in gage as compared with other parts or sections of the crowns, and thereby rendered less able to resist the force and wear of mastication. To compensate for the reduction of gage, it is the practice to thicken the grinding-section by melting in the hollow of the crown a quantity of solder and flowing it over the inside surface, and thereby thicken the section by the layer of solder, and thus strengthen the metal of the section. Considerable difficulty is experienced in performing this operation, as there is danger of melting the thin gold forming the cusps and indentations of the grinding-surface. As the solder aided by the flux has a great affinity for the gold which absorbs it, it is apt to perforate the thin metal of these parts, which, being more prominent, take up a great degree of heat and are more readily affected by the solder. Furthermore, where a metal crown is constructed in sections soldered together thickening by means of melted solder is apt to open the seams and destroy the crown.

The object of my invention is to protect metal tooth-crowns against the action of melted solder when flowed into them for the purpose of thickening and strengthening the grinding-surface.

To this end the invention consists in a tooth-crown provided with an interior cap or lining of non-fusible metal so placed and secured in the crown as to protect the parts thereof liable to be affected by the hot solder used in thickening the same.

Figure 1:
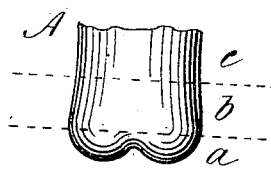
Figure 2:
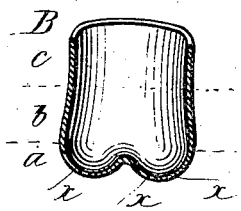
Figure 3:
Figure 4:
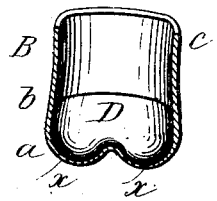
Figure 5:
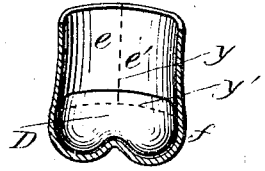

In the accompanying drawings, Figure 1 represents the outline of a tooth, showing the three parts into which it is divided. Fig. 2 represents in section a metal tooth-crown, the parts corresponding to the divisions of the natural tooth being indicated by horizontal dotted lines, showing, also, the thinning effect on the grinding-section of shaping and swaging the crown to fit it to the natural tooth; Fig. 3, a non-fusible metal cap for placing in the crown over the inside surface of the grinding-section. Fig. 4 represents a sectional view of a metal crown fitted with a non-fusible metal cap or lining. Fig. 5 represents a sectional view of a metal tooth-crown constructed of sections and with the seams of the sections protected by a non-fusible cap or lining.

Referring to the drawings, Fig. 1, A indicates the crown of a natural tooth, which is technically divided into three parts or sections—viz., the grinding-section or third *a*, middle third *b*, and cervical third *c*—and metal artificial crowns are likewise divided, as indicated by the metal tooth-crown B. (Shown in Fig. 2.) The tooth-crown B is represented as it appears after being fitted to a natural tooth—that is, after being swaged and shaped to make it conform to the natural tooth for which it is intended. By this operation the sides of the cusps and the indentations are thinned or reduced in gage as composed with other parts of the crown, as shown at *x x x*, Fig. 2.

D represents a non-fusible metal cap, preferably made of platina-foil or other non-fusible metal sufficiently thin not to perceptibly thicken the crown. This cap is made to conform exactly to the inside surface of the grinding-section of the metal crown with which it is intended to be used. Thus the crown B being a bicuspid, its bottom part is shaped like the grinding-surface of the crown—that is, with two cusps and an indentation—so that when placed in the hollow of the crown it makes a perfectly-even connection therewith, as shown in Fig. 4. The sides of the cap conform likewise to the sides of the crown, and by preference the sides are extended upward partly onto the surface of the middle third, as shown. This supplementary cap is fitted in the hollow of the crown and sweated to the interior surface thereof by repeated swaging, burnishing, and heating.

The cap thus constructed and applied to a gold tooth-crown forms a non-fusible reservoir, into which the quantity of solder required to properly thicken the grinding-surface can be flowed without coming in contact with the gold or affecting it injuriously in any way.

The metal crown represented by Fig. 5 is constructed of sections, the cervical and middle thirds being formed of sections $e$ $e'$ and the grinding third of section $f$, the whole being soldered together at the meeting edges, thus forming seams $y$ $y'$. It can be seen readily that when solder is flowed into the hollow of a crown of this construction there is great liability of the heat opening the seams and spoiling the crown; but by the use of a non-fusible metal cap D, which covers the seam between the grinding and middle thirds and also the lower part of the seam or seams in the middle third, the said seams are protected from the hot solder, and thus these sectional crowns can be easily and successfully thickened, which is otherwise a difficult operation.

I claim—

A metallic tooth-crown furnished with a non-fusible lining, which covers the grinding or occluding third and is confined to the said third and the immediately adjoining parts of the middle third, to prevent fusion of the exposed parts of the crown in the process of soldering or filling with solder, substantially as specified.

In testimony that I claim the invention above set forth I have affixed my signature in presence of two witnesses.

GEORGE EVANS.

Witnesses:
  F. D. AMES,
  J. JAMISON RAPHAEL.